Patented May 1, 1928.

1,668,148

UNITED STATES PATENT OFFICE.

RICHARD HERZ AND FRITZ SCHULTE, OF FRANKFORT-ON-THE-MAIN, GERMANY, ASSIGNORS TO GRASSELLI DYESTUFF CORPORATION, OF NEW YORK, N. Y., A CORPORATION OF DELAWARE.

PROCESS FOR MANUFACTURING 1-AMINONAPHTHALENE-8-CARBOXYLIC ACID.

No Drawing. Original application filed July 12, 1926, Serial No. 122,030, and in Germany November 29, 1924. Divided and this application filed May 9, 1927. Serial No. 190,127.

This application is a division of our application Serial No. 122,030, filed July 12th, 1926, and relates to a new and original process for manufacturing the 1-aminonaphthalene-8-carboxylic acid in a pure state with an almost quantitative yield and at comparatively low costs. Hitherto this acid could not be produced in a technical scale.

Our new process consists in allowing an alkaline acting agent to react at elevated temperatures on 8-cyannaphthalene-1-sulfonic acid.

The chemical reaction which takes place runs probably as follows:

In the first phase of the reaction probably the cyanogen group is saponified to the carboxyamidogroup; the resulting intermediate product, namely the 8-naphthamide-1-sulfonic acid, can be isolated when carrying out the reaction. Then, in the second phase, the sulfogroup is split off and a ring is formed, namely the inner anhydride of the 1-aminonaphthalene-8-carboxylic acid, known in the literature as naphthostyril. This latter compound is easily saponified by the action of dilute alkalies to the 1-aminonaphthalene-8-carboxylic acid.

The following formulæ illustrate the course of the reactions:

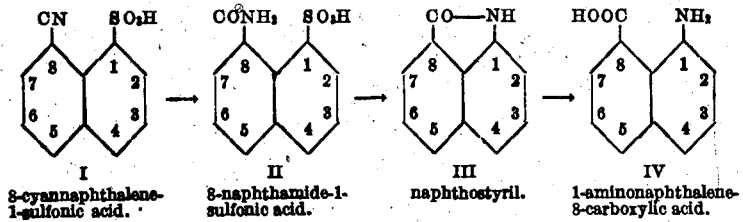

I
8-cyannaphthalene-1-sulfonic acid.

II
8-naphthamide-1-sulfonic acid.

III
naphthostyril.

IV
1-aminonaphthalene-8-carboxylic acid.

In carrying out our process practically caustic alkalies in aqueous or alcoholic solution or alkaline earth metal compounds, preferably milk of lime, may be used either at ordinary pressure or in a closed vessel at elevated pressure.

The starting material for the process, 8-cyannaphthalene-1-sulfonic acid, is easily obtainable in the usual manner by converting 8-aminonaphthalene-1-sulfonic acid to its corresponding diazo-compound and treating the latter with cuprous cyanide according to the Sandmeyer reaction. It forms a difficultly soluble sodium salt, which may be isolated from its solutions by the addition thereto of comomn salt or by an equivalent procedure. The free 8-cyannaphthalene-1-sulfonic acid may be obtained by converting the sodium salt into the difficultly soluble lead salt and setting the acid free in the usual manner, for instance, by precipitating the lead with the corresponding amount of sulfuric acid or hydrogen sulfide. The 8-cyannaphthalene-1-sulfonic acid is very easily soluble in water and shows a strong acid reaction.

The new process may be illustrated by the following example, the parts being by weight and all temperatures in centigrade degrees:

Example.

1 part of the sodium salt or of any suitable salt of the 8-cyannaphthalene-1-sulfonic acid is heated with 15 parts of milk of lime of 25° Bé. for some hours at 200–250° in an autoclave, while stirring. The 1-amiho-naphthalene-8-carboxylic acid, thus formed, remains in solution in the form of its easily soluble calcium-salt. The mass is diluted with water, filtered off, and the free acid is isolated from the filtrate by acidifying it.

We wish it to be understood that, when working in the autoclave, the pressure corresponds functionally to the tension of the reacting agent and the temperature applied.

We claim:

1. Process for the manufacture of an 1-aminonaphthalene-8-carboxylic acid compound which comprises treating an 8-cyannaphthalene-1-sulfonic acid compound with an alkaline earth metal hydroxide at elevated temperatures not exceeding about 250° C. and under elevated pressure.

2. Process for the manufacture of an 1-aminonaphthalene-8-carboxylic acid compound which comprises treating a salt of 8-cyannaphthalene-1-sulfonic acid with an alkaline earth metal hydroxide at elevated temperatures not exceeding about 250° C. and under elevated pressure.

3. Process for the manufacture of an 1-aminonaphthalene-8-carboxylic acid compound which comprises treating a salt of 8-cyannaphthalene-1-sulfonic acid with milk of lime at elevated temperatures not exceeding about 250° C. and under elevated pressure.

4. Process for the manufacture of an 1-aminonaphthalene-8-carboxylic acid compound which comprises treating an 8-cyannaphthalene-1-sulfonic acid compound with an alkaline acting compound of an alkaline earth metal at a temperature of from about 200° to about 250° C., and under elevated pressures.

In testimony whereof, we affix our signatures.

RICHARD HERZ.
FRITZ SCHULTE.